(12) United States Patent
Dinerstein et al.

(10) Patent No.: US 9,405,995 B2
(45) Date of Patent: Aug. 2, 2016

(54) METHOD AND APPARATUS FOR FACIAL IDENTIFICATION

(75) Inventors: Jonathan J. Dinerstein, Draper, UT (US); Jason S. Webb, Saratoga Springs, UT (US); John B. Bridge, Sandy, UT (US); Dustin E. Currie, Humble, TX (US); Sabra A. Dinerstein, Lehi, UT (US); Brian H. Rosenlof, Eagle Mountain, UT (US); Christopher Case, Draper, UT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1572 days.

(21) Appl. No.: 12/458,415

(22) Filed: Jul. 10, 2009

(65) Prior Publication Data
US 2010/0008550 A1 Jan. 14, 2010

Related U.S. Application Data

(60) Provisional application No. 61/129,699, filed on Jul. 14, 2008.

(51) Int. Cl.
*G06K 9/00* (2006.01)
*G06K 9/62* (2006.01)

(52) U.S. Cl.
CPC .......... *G06K 9/6253* (2013.01); *G06K 9/00288* (2013.01)

(58) Field of Classification Search
CPC ................................................ G06K 9/00228
See application file for complete search history.

(56) References Cited

U.S. PATENT DOCUMENTS

| 5,990,901 | A | 11/1999 | Lawton et al. |
| 7,027,620 | B2 | 4/2006 | Martinez |
| 7,203,346 | B2 | 4/2007 | Kim et al. |
| 7,308,133 | B2 | 12/2007 | Gutta et al. |
| 7,321,670 | B2 | 1/2008 | Yoon et al. |
| 7,499,574 | B1 | 3/2009 | Yang et al. |
| 2003/0063781 | A1 | 4/2003 | Philomin et al. |
| 2003/0063795 | A1 | 4/2003 | Trajkovic et al. |
| 2005/0105779 | A1 | 5/2005 | Kamei |
| 2005/0117783 | A1 | 6/2005 | Sung et al. |
| 2006/0146062 | A1 | 7/2006 | Kee et al. |
| 2006/0153430 | A1 | 7/2006 | Canzler et al. |
| 2007/0036398 | A1 | 2/2007 | Chen |
| 2007/0098231 | A1* | 5/2007 | Minato ............. G06K 9/00281 382/118 |
| 2007/0122005 | A1 | 5/2007 | Kage et al. |

(Continued)

FOREIGN PATENT DOCUMENTS

JP 2007150601 A * 6/2007
JP 2007249588 A * 9/2007

*Primary Examiner* — Kim Vu
*Assistant Examiner* — Fred Hu
(74) *Attorney, Agent, or Firm* — Oblon, McClelland, Maier & Neustadt, L.L.P.

(57) ABSTRACT

Aspects of the disclosure can provide a face recognition method of increased robustness. The face recognition method can include receiving a target face image, initializing a registration and a block analysis of the target face image identifying one or more portions of the target face image for face recognition, informing a user of the registration and the block analysis, receiving one or more instructions from the user for operating on the registration and the block analysis, and identifying the target face image from a plurality of face images based on the registration and the block analysis of the target face image when the registration and the block analysis are approved by the user.

16 Claims, 5 Drawing Sheets

(56) References Cited

U.S. PATENT DOCUMENTS

| | | |
|---|---|---|
| 2007/0127787 A1 | 6/2007 | Castleman et al. |
| 2007/0196001 A1* | 8/2007 | Yanagawa .......... G06K 9/00288 382/118 |
| 2008/0052312 A1* | 2/2008 | Tang et al. ................. 707/104.1 |
| 2008/0166036 A1* | 7/2008 | Bloom ............... G06K 9/00127 382/133 |
| 2008/0175448 A1 | 7/2008 | Fujiwara et al. |
| 2008/0247609 A1 | 10/2008 | Feris et al. |
| 2008/0279423 A1 | 11/2008 | Zhang et al. |
| 2008/0285816 A1 | 11/2008 | Kim et al. |
| 2008/0298643 A1 | 12/2008 | Lawther et al. |
| 2008/0317354 A1* | 12/2008 | Shiratani ....................... 382/195 |
| 2009/0041310 A1 | 2/2009 | Yang et al. |
| 2009/0060295 A1* | 3/2009 | Inoue ................ G06F 17/30247 382/118 |
| 2009/0135269 A1* | 5/2009 | Nozaki et al. .............. 348/222.1 |

* cited by examiner

METHOD AND APPARATUS FOR FACIAL IDENTIFICATION

INCORPORATION BY REFERENCE

This application claims the benefit of U.S. Provisional Application No. 61/129,699, "Identification of Partial Faces" filed on Jul. 14, 2008, which is incorporated herein by reference in its entirety.

BACKGROUND

In various situations, non-ideal face images may be used in facial recognition. For example, a face image may be taken in a harsh shadow. In another example, a face image may include sunglasses covering a portion of the face. The non-ideal face images may result in unsuccessful face recognition.

SUMMARY

Aspects of the disclosure can provide a face recognition method of increased robustness. The face recognition method can include receiving a target face image, initializing a registration and a block analysis of the target face image identifying one or more portions of the target face image for face recognition, informing a user of the registration and the block analysis, receiving one or more instructions from the user for operating on the registration and the block analysis, and identifying the target face image from a plurality of face images based on the registration and the block analysis of the target face image when the registration and the block analysis are approved by the user.

Further, the face recognition method can include updating the registration when a registration updating instruction is received and updating the block analysis when a block analysis updating instruction is received.

To initialize the block analysis of the target face image, the face recognition method can include initializing the block analysis of the target face image based on at least one of a case-based reasoning and a model-based reasoning.

To identify the target face image from the plurality of face images based on the registration and the block analysis of the target face image, the face recognition method can include encoding the plurality of face images and the target face image based on the approved registration and block analysis. In addition, the face recognition method can include calculating matching scores for the encoded plurality of face images comparing to the encoded target image, and identifying the target face images according to the matching scores.

To encode the plurality of face images and the target face image based on the approved block analysis, the face recognition method can include selecting a portion of a face image based on the approved block analysis, and encoding the portion by at least one of a local binary patterns (LBP) algorithm and a regional Gabor algorithm.

To inform the user of the block analysis, the face recognition method can include displaying the target face image, and superimposing a marking for a portion of the target face image on the displayed portion of the target face image.

Aspects of the disclosure can also provide a face recognition system. The face recognition system can include a user interface module and a processor module. The user interface module can be configured to display a target face image and a registration of the target face image and receive instructions from an analyst. In addition, the user interface module can be configured to display a target face image and a block analysis of the target face image and receive instructions from an analyst. The processor module can be configured to receive the target face image, initialize a registration and a block analysis of the target face image identifying one or more portions of the target face image for face recognition, provide the registration and the block analysis to the user interface module to inform the analyst of the registration and the block analysis, receive one or more instructions from the user interface module for operating on the registration and the block analysis, and identify the target face image from a plurality of face images based on the registration and the block analysis of the target face image when the registration and the block analysis are approved by the user.

In addition, the processor module can be configured to update the registration when a registration updating instruction is received from the user interface module and update the block analysis when a block analysis updating instruction is received. Further, the processor module can be configured to initialize the block analysis of the target face image based on at least one of a case-based reasoning and a model-based reasoning.

According to an aspect of the disclosure, the face recognition system can include a memory unit configured to store the plurality of face images.

In an embodiment, the processor module can be configured to encode the plurality of face images and the target face image based on the approved block analysis. To encode an image, the processor module can be configured to select a portion of a face image based on the approved block analysis, and encode the portion by at least one of a local binary patterns (LBP) algorithm and a regional Gabor algorithm.

In an embodiment, the user interface module can be configured to display the target face image, and superimpose a marking for a portion of the target face image on the displayed portion of the target face image.

Aspects of the disclosure can also provide a computer readable medium storing program instructions for causing a controller to perform face recognition steps. The face recognition steps can include receiving a target face image, initializing a registration and a block analysis of the target face image identifying one or more portions of the target face image for face recognition, informing a user of the registration and the block analysis, receiving one or more instructions from the user for operating on the registration and the block analysis, and identifying the target face image from a plurality of face images based on the registration and the block analysis of the target face image when the registration and the block analysis are approved by the user.

Other face recognition steps can include updating the registration when a registration updating instruction is received, updating the block analysis when a block analysis updating instruction is received, encoding the plurality of face images and the target face image based on the approved registration and block analysis, displaying the target face image, and superimposing a marking for a portion of the target face image on the displayed portion of the target face image.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
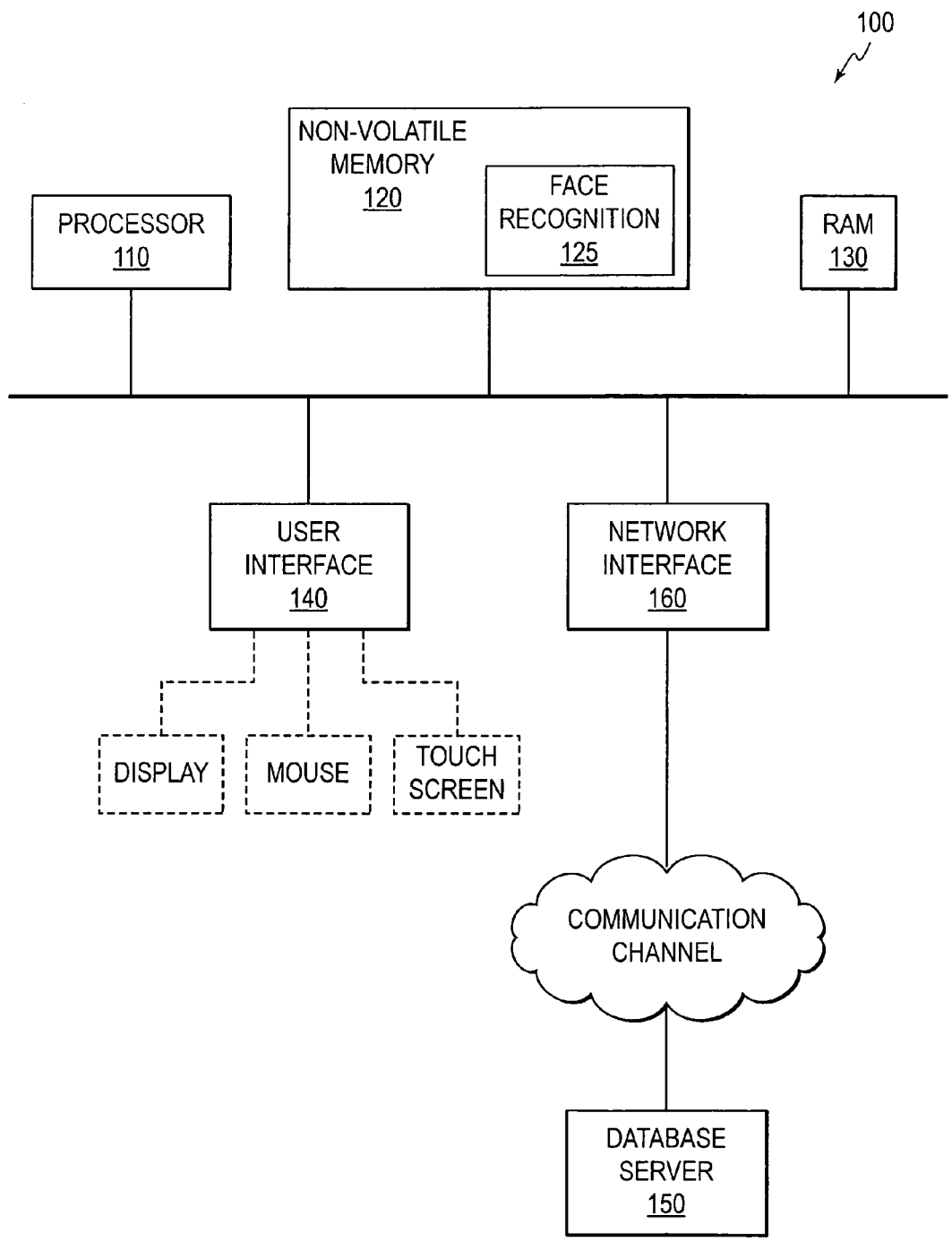
FIG. 1 shows a block diagram of an exemplary face recognition system according to an embodiment of the disclosure.

FIG. 1 shows a block diagram of an exemplary face recognition system according to an embodiment of the disclosure. The face recognition system 100 can include various components, such as a processor module 110, a non-volatile memory unit 120, a RAM unit 130, a user interface module 140, a network interface module 160, and the like. These components can be coupled together as shown in FIG. 1.

The processor module 110 can execute system and application codes. More specifically, the processor module 110 may execute system codes to maintain an appropriate status of the face recognition system 100. Further, the processor module 110 can execute application codes to control the face recognition system 100 to perform specific functions. For example, the processor module 110 may execute codes for a human-in-the-loop face recognition. It is noted that the processor module 110 may include one or more processors for performing required functions. In an example, the face recognition system 100 can be configured as a single-processor computer. In another example, the face recognition system 100 can be configured as a multiple-processor computer. The multiple-processor computer may include multiple processors that can operate in parallel to improve the speed of the face recognition. Alternatively, the face recognition system 100 may include multiple computers coupled together. The multiple computers can be configured to work in parallel to improve the speed of the face recognition.

The non-volatile memory unit 120 can store system and application codes that generally do not change, such as firmware. The non-volatile memory 120 may store a human-in-the-loop face recognition module 125. The human-in-the-loop face recognition module 125 can be executed by the processor module 110 to perform the face recognition. In an embodiment, the non-volatile memory unit 120 may include semiconductor memory devices, such as electrically programmable read-only memory (EPROM), electrically erasable programmable read-only memory (EEPROM), and the like, that can hold information even when power is off. In another embodiment, the non-volatile memory unit 120 may include a magnetic storage medium, such as a hard drive, that can magnetically store the codes. In another embodiment, the non-volatile memory unit 120 may include an optical storage medium, such as compact disc (CD), digital video disc (DVD), and the like, that can optically store the codes.

The RAM unit 130 is writeable and readable, and can be accessed at a fast speed. It can be preferred that data and codes are in the RAM unit 130 for the processor module 110 to access during operation. In an example, the face recognition system 100 may include a memory management module (not shown). The memory management module can copy codes from the non-volatile memory unit 120 to the RAM unit 130 for the processor module 110 to execute.

The user interface module 140 can couple the face recognition system 100 with user interactive devices, such as a display screen, a mouse, a touch screen, and the like. The user interactive devices can enable a user, such as an analyst, to be involved in the face recognition, and drive the face recognition. In an example, the face recognition system 100 may initialize a registration for a target face image. The registration may obtain a facial portion from the target face image for face recognition based on facial features. In addition, the face recognition system 100 may initialize a block analysis for the registered facial portion. More specifically, the registered facial portion may be divided into blocks, and each block can be marked in a binary fashion as occluded or non-occluded. The blocks marked as occluded may include occlusions, beard growth, tattoos, extreme expressions, and the like. Then, the marked blocks can be superimposed with the target face image on a touch screen via the user interface module 140. In addition, the touch screen may provide a control panel, such as buttons, menus, and the like, to allow an analyst to make changes or approve the face block registration.

The network interface 160 can be configured to enable the face recognition system 100 to communicate with other devices or systems. In an example, the network interface 160 may couple a face image database sever 150 with the face recognition system 100. The face image database server 150 can include a plurality of face images of known identities. The plurality of face images can be accessed by the face recognition system 100 via the network interface 160. The plurality of face images may be processed by the processor module 110, for example, encoded based on the registration and the block markings.

It is also noted that the plurality of face images may be stored in the face recognition system 100, such as in the non-volatile memory unit 120.

During operation, for example, the processor module 110 may execute the human-in-the-loop face recognition module 125. The human-in-the-loop face recognition module 125 can receive a target face image and initialize a registration for the target face image. The registration can be informed to an analyst via the user interface module 140. In addition, the human-in-the-loop face recognition module 125 can initialize block markings for the registered portion of the target face image. The block markings can be informed to the analyst viat the user interface module 140. Then, the analyst may instruct the face recognition system 100 via the user interface module 140. The analyst can give control instructions from various aspects. For example, the analyst may approve the registration, change the registration, change a marking for a block, reshape a block, and the like. The control instructions can be received by the processor module 110 for further processing.

When the analyst approves a registration and block markings, the processor module 110 may use the registration and the block markings to encode the target face image and a plurality of face images of known identities into digital representations, and can score the plurality of face images based on digital representation comparison of the target image and the plurality of face images. More specifically, the processor module 110 may crop portions of each face image that correspond to blocks that are marked as non-occluded. Then, the non-occluded blocks of the target face image can be encoded into digital representations by any suitable algorithms, such as local binary patterns (LBP), regional Gabor, and the like. In addition, the non-occluded blocks of each of the plurality of face images can be encoded into digital representations in the same manner. Further, the digital representations of the plurality of face images can be compared to the digital representations of the target face image. The comparison result can be informed to the analyst via the user interface 140.

Figure 2:
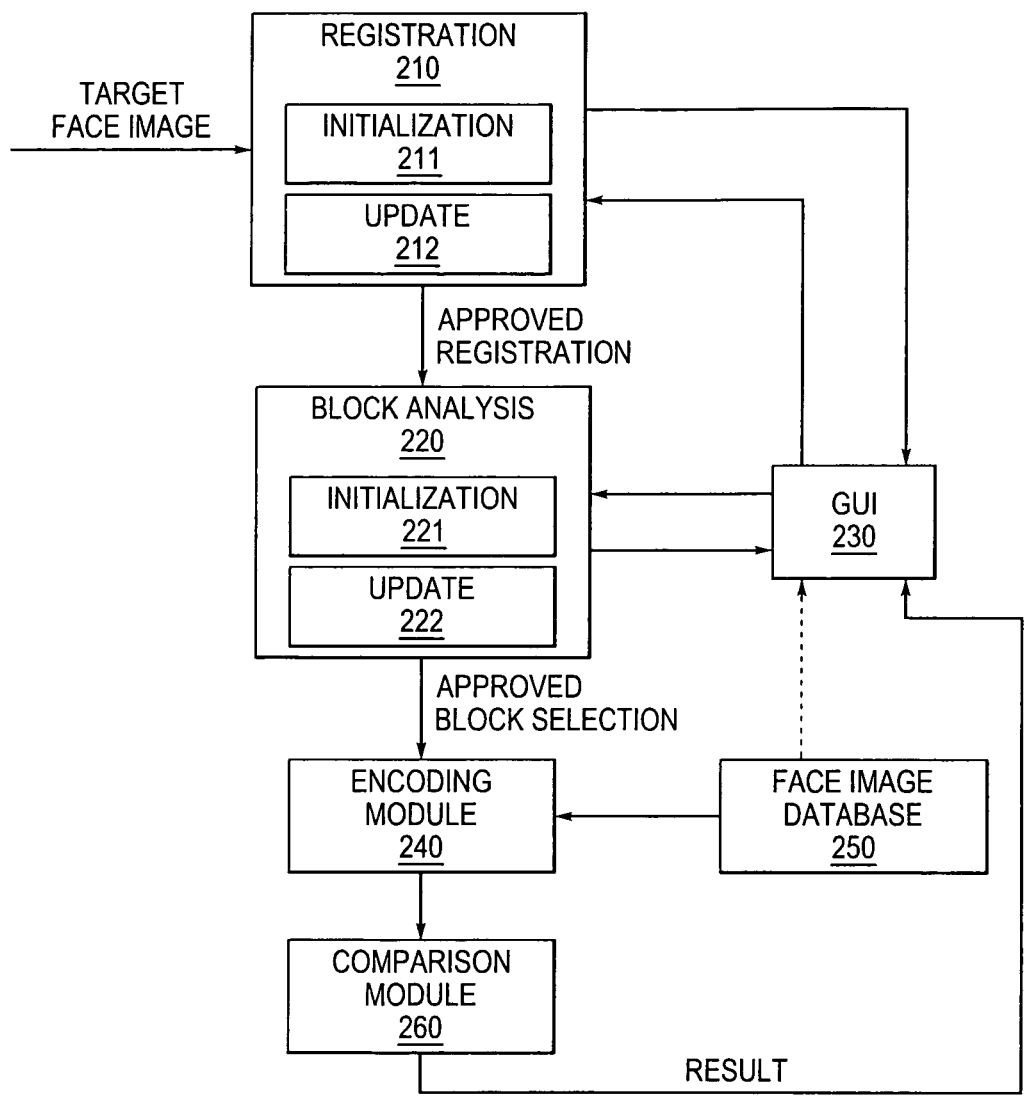
FIG. 2 shows a functional block diagram of an exemplary face recognition system according to an embodiment of the disclosure.

FIG. 2 shows a functional block diagram of an exemplary face recognition system according to an embodiment of the disclosure. The face recognition system 200 may include a registration module 210, a block analysis module 220, a graphical user interface (GUI) module 230, an encoding module 240, a face image database module 250 and a comparison module 260. These functional elements can be coupled together as shown in FIG. 2.

The registration module 210 can receive a target face image, and generate an approved registration for the target face image. The registration module 210 may include a registration initialization module 211 and a registration update module 212. The registration initialization module 211 can include any suitable algorithms that can automatically generate an initial registration for the target face image. The initial registration can be provided to the registration update module 212, and can be provided to the GUI module 230 to inform the human analyst. The human analyst may review the registration and give instructions via the GUI module 230. The GUI module can relay the instructions to the registration update module 212. Subsequently, the registration update module 212 can update the initial registration based on the instructions, and may provide the updated registration to the GUI module 230 to inform the human analyst. When the human analyst approves the registration via the GUI module 230, the approved registration can be provided to the block analysis module 220.

The block analysis module 220 can receive the approved registration, and provide blocks with markings based on the approved registration. The block analysis module 220 can include a block marking initialization module 221 and a block marking update module 222. The block marking initialization module 221 can include any suitable algorithms that can automatically divide a facial image into blocks, and mark the blocks.

In an embodiment, the block marking initialization module 221 may include a machine learning-based algorithm, such as case-based reasoning algorithm, model-based reasoning algorithm, and the like. In an example, the block marking initialization module 221 may include a locality-specific, single-class, case-based reasoning algorithm to divide the registered facial image into blocks and assign markings to the blocks based on a previous successful case. The locality-specific, single-class, case-based reasoning algorithm can perform the block analysis with fast speed and without human involvement.

In another example, the block marking initialization module 221 may include a model-based reasoning algorithm to divide the registered facial image into blocks and assign markings to the blocks based on a model learned from a group of face images. The block marking initialization module 221 can use various techniques to expedite the initial block analysis, for example, by using a simple model with rectangle-shaped blocks. Further, the initial block markings can be refined by other functional blocks via interactive communication with a human analyst.

The block analysis module 220 can provide the initial block analysis, such as the block markings, to the GUI module 230 to inform the human analyst. The human analyst may give instructions regarding the block analysis via the GUI module 230. The block analysis module 220 can receive the instructions and the block marking update module 222 can update the block analysis based on the instructions. The updated block analysis can then be provided to the GUI module 230 for visualization to the human analyst. When the human analyst approve the block analysis via the GUI module 230, the approved block analysis, more specifically, blocks and markings, can be provided to the encoding module 240.

The GUI module 230 can provide an interface between the face recognition system 200 and the human analyst. The interface can provide various interactive communication functions, such as visualization, control, and the like, to facilitate the human analyst to drive the face recognition system 200. For example, the GUI module 230 may receive a registration for the target face image, and visualize the registration to facilitate the human analyst to refine the block registration. More specifically, the GUI module 230 can be configured to superimpose the registration, such as feature guidelines for the registration, with the target face image on a display device, such that the human analyst can see both the registration and the target face image and determine whether further refining is needed.

In another example, the GUI module 230 may enable interactive controls by the human analyst. The GUI module 230 can be configured to receive instructions from a user input device, such as a mouse. The instructions can be transmitted to, for example, the registration module 210 to update the registration, or the block analysis module 220 to update the block analysis. The GUI module 230 can be suitably configured to provide various levels of control, such as approval, resizing, reshaping, remarking, and the like, by the human analyst.

The encoding module 240 can receive the approved block analysis, such as approved blocks and markings, from the block analysis module 220. In addition, the encoding module 240 may receive the target face image, and a plurality of face images. In the FIG. 2 example, the plurality of face images can come from the face image database 250. Further, the encoding module 240 can encode the target face image and the plurality of face images based on the approved blocks and markings, respectively. In an example, the encoding module 240 may select non-occluded portions of an image, and encode the non-occluded portions based on any suitable local algorithms, such as local binary patterns (LBP) and regional Gabor, as the digital representation of the image.

The face image database module 250 may include face images of known identities. The face image database module 250 can provide the plurality of face images to other functional module blocks, such as the GUI module 230, and the encoding module 240.

The comparison module 260 can compare the encoded target face image, and the encoded plurality of face images of known identities by any suitable algorithms. In an example, the comparison module 260 may calculate a matching score for each of the encoded plurality of face images comparing to the encoded target face image. Then, the comparison module 260 may inform the matching scores to the human analyst. In an embodiment, the GUI module 230 may display a face image with its matching score for the human analyst.

During operation, for example, the registration module 210 can receive a target face image, and generate an initial registration for the target face image. The initial registration can be provided to the GUI module 230 to be informed to the human analyst visually. Further, the human analyst may give an instruction via the GUI module 230. The GUI module 230 may relay the instruction to the registration module 210. The registration module 210 may update the registration based on the instruction, and then provide the updated registration to the GUI module 230 to inform the human analyst, and wait for further instructions from the human analyst.

When the human analyst approves a registration, the approved registration can be provided to the block analysis module 220. The block analysis module 220 may initialize a block analysis for the approved registration. The initial block analysis can be provided to the GUI module 230 to be informed to the human analyst visually. Further, the human analyst may give an instruction via the GUI module 230. The GUI module 230 may relay the instruction to the block analysis module 220. The block analysis module 220 can update the block analysis based on the instruction, and then provide the updated block analysis to the GUI module 230 to inform the human analyst, and wait for further instructions from the human analyst.

When the human analyst approves a block analysis, such as a set of marked blocks, the approved block analysis can be provided to the encoding module 240. The encoding module 240 can receive the target face image, and a plurality of face images from the face image database 250. Further, the encoding module 240 can respectively encode the target face image and the plurality of face images into digital representations based on the approved block analysis. Then, the digital representations can be provided to the comparison module 260. The comparison module 260 can calculate a matching score for each of the encoded plurality of face images comparing to the encoded target face image. Then, the comparison module 260 may inform the matching scores to the human analyst via the GUI module 230.

Figure 3:
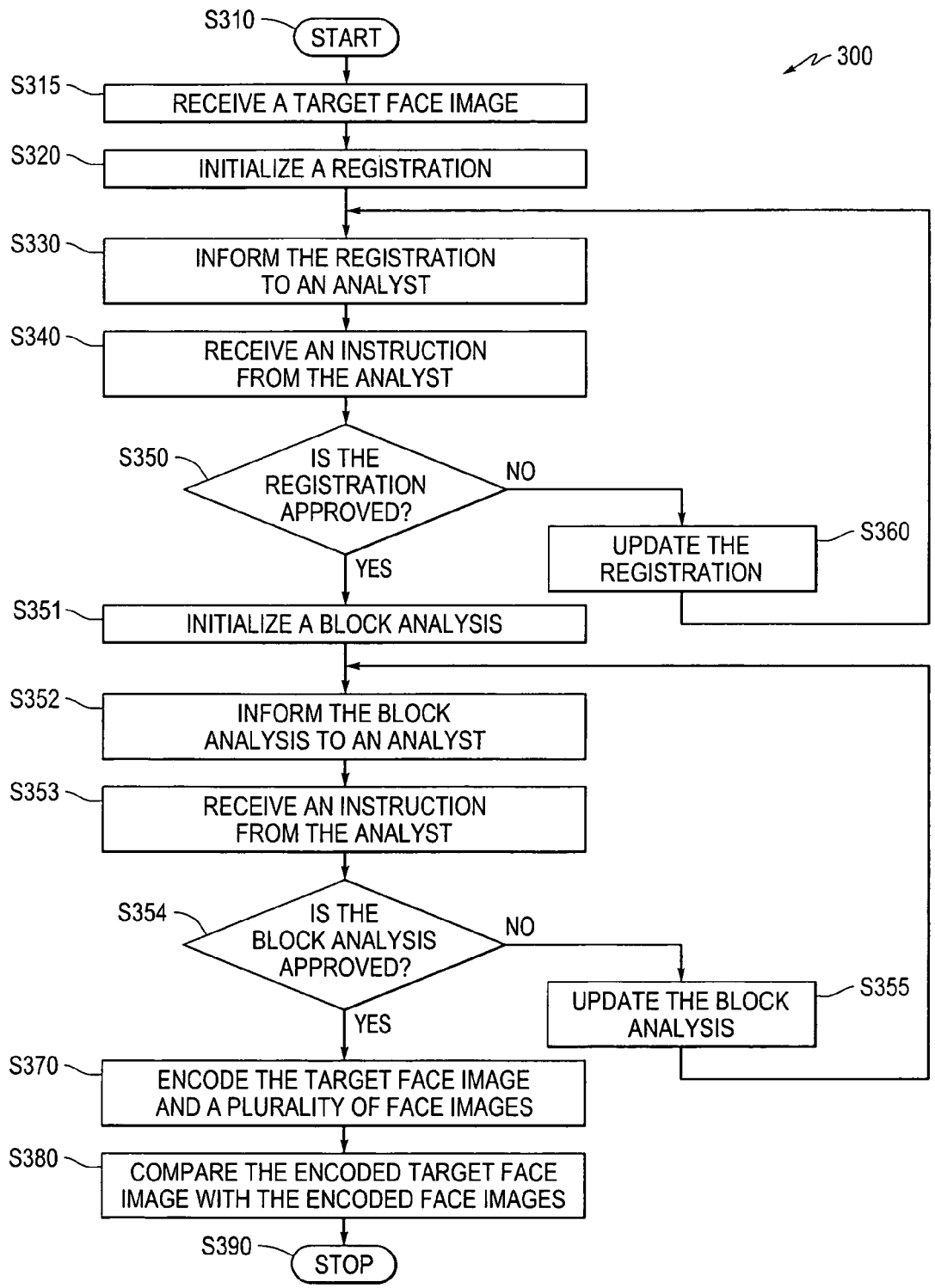
FIG. 3 shows a flow chart outlining an exemplary face recognition process according to an embodiment of the disclosure.

FIG. 3 shows a flow chart outlining an exemplary facial recognition process according to an embodiment of the disclosure. The process 300 starts from step S310, and proceeds to step S315.

In step S315, a face recognition system, such as the face recognition system 100, may receive a target face image. The target face image may originate from any suitable imaging devices, such as a camera, a camcorder, a surveillance device, a scanner, a fax machine, and the like. The target face image may be pre-processed and stored. For example, the target face image may be cropped from a larger-size image. In addition, the target face image may be resized, and color-tuned. The target face image can be formatted in any suitable image formats, such as JPEG, 24-bit bitmap, and the like. Then, the process proceeds to step S320.

In step S320, the face recognition system may automatically initialize a registration based on the received target face image. In an example, the face recognition system may initialize the registration based on facial features. The face recognition system may identify facial features, such as eyes, noise, mouth, and the like, and determine a facial portion based on the facial features. Then, the process proceeds to step S330.

In step S330, the face recognition system may inform an analyst of the registration. The face recognition system may provide the registration to the analyst by various mechanisms, such as a graphical user interface (GUI). The GUI can display a graphic target face image with the initial registration, such as guidelines of the facial features, superimposed. The GUI can enable the analyst to view both the target face image and the initial registration. Then, the process proceeds to step S340.

In step S340, the face recognition system may receive an instruction from the analyst. In an example, the GUI can enable the analyst to change the positions of the facial feature guidelines. In addition, the GUI may provide a button for approving the registration. Then, the process proceeds to step S350.

In step S350, the face recognition system may determine whether the registration is approved by the analyst. When the received instruction indicates that the analyst approves the registration, the process proceeds to step S351; otherwise, the process proceeds to step S360.

In step S360, the face recognition system may update the registration based on the instruction received from the analyst. In an example, the face recognition system may update the registration based on the new positions of the facial feature guidelines. Then, the process returns to step S330 to inform the analyst of the updated registration.

In step S351, the face recognition system may automatically initialize a block analysis based on the approved registration. More specifically, the face recognition system may divide the registered facial portion into blocks, and mark the blocks, for example, as either occluded or non-occluded. In an example, the face recognition system may initialize the block analysis based on machine learning technology, such as using case-based reasoning, model-based reasoning, and the like. The machine learning technology may use various techniques to expedite the initialization process. In an embodiment, the face recognition system may use locality-specific, single-class, case-based reasoning to initialize the block analysis based on one or more previous successful cases. In another embodiment, the face recognition system may initialize the block analysis based on a rectangle-shaped block model. Then, the process proceeds to step S352.

In step S352, the face recognition system may inform an analyst of the block analysis. The face recognition system may provide the block analysis to the analyst by various mechanisms, such as a graphical user interface (GUI). The GUI can include a graphic target face image with the initial block analysis, for example, blocks with markings, superimposed. The GUI can enable the analyst to view both the target face image and the initial block analysis. Then, the process proceeds to step S353.

In step S353, the face recognition system may receive an instruction from the analyst. In an example, the GUI can provide a control panel with selectable control functions that can be used to modify the block analysis. The control panel can enable various levels of controls from the analyst. In an example, the control panel may include an approving button that can be clicked to approve the block analysis. In another example, the control panel may include control selections to enable the analyst to change the shape or size of the blocks in the block analysis, and may also include selections to enable the analyst to change a marking of a block. In another example, the control panel may include control selections that can enable the analyst to generate a new block registration. Then, the process proceeds to step S354.

In step S354, the face recognition system may determine whether the block analysis is approved by the analyst. When the received instruction indicates that the analyst approves the block analysis, the process proceeds to step S370; otherwise, the process proceeds to step S355.

In step S355, the face recognition system may update the block analysis based on the received instruction. Then, the process returns to step S352 to inform the analyst of the updated block analysis.

In step S370, the face recognition system may encode the target face image and a plurality of face images based on the approved block analysis. In an example, the face recognition system may include a database of face images having known identities. The face recognition system may encode a plurality of face images from the database based on the approved block analysis. More specifically, for each face image, the face recognition system may crop portions of the face image that correspond to the non-occluded blocks in the block analysis. Further, the face recognition system may encode the cropped portions using a local facial algorithm, such as local binary patterns (LBP), regional Gabor, and the like. Then, the process proceeds to step S380.

In step S380, the face recognition system may compare the encoded target image with the encoded plurality of face images. In an embodiment, the face recognition system may calculate a matching score for each of the plurality of face images by comparing the encoded face image with the encoded target face image. Further, the face recognition system may sort the plurality of face images based on the matching scores. In addition, the face recognition system may provide the sorting result to the analyst, for example, via the graphical user interface. Then, the process proceeds to step S390 and terminates.

It is noted that one or more steps of the above process can be repetitively executed. For example, after the viewing the result, the analyst may further refine the registration and/or the block analysis and repeat the encoding and comparing steps.

Figure 4:
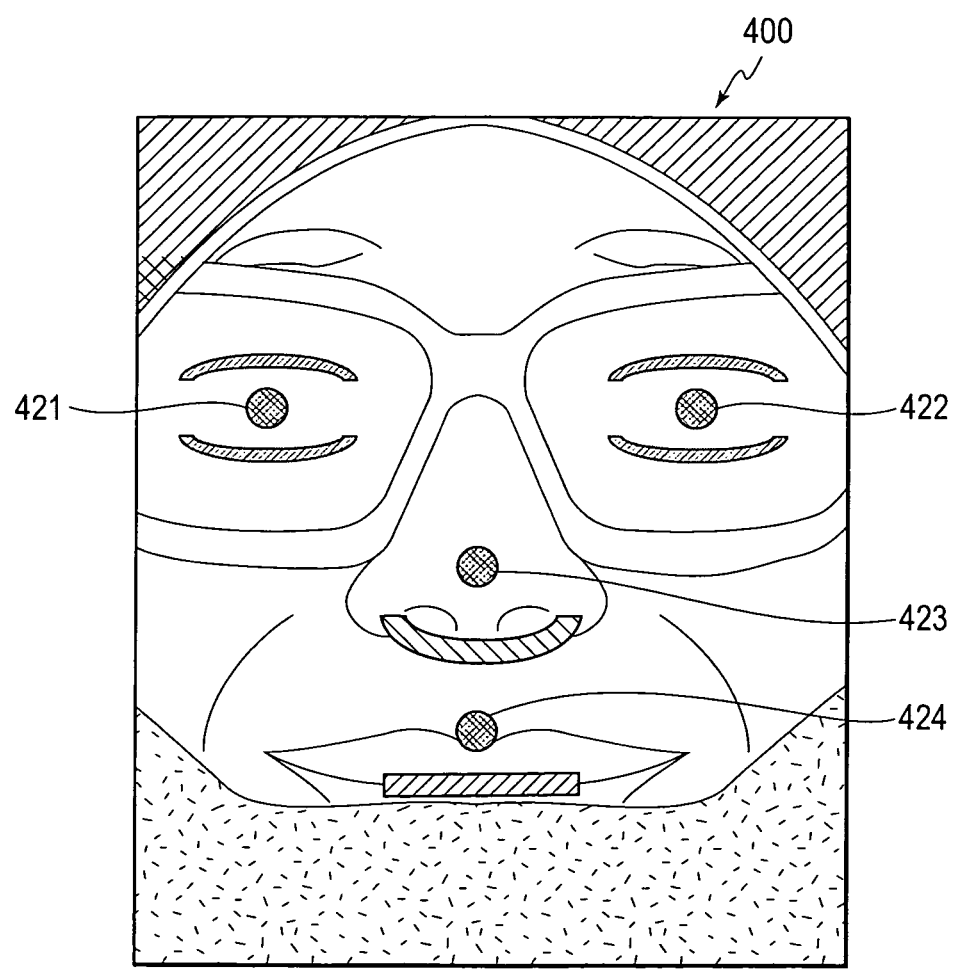
FIG. 4 shows a plot of an exemplary graphical user interface for interactive registration according to an embodiment of the disclosure.

FIG. 4 shows a plot of an exemplary graphical user interface for interactive registration according to an embodiment of the disclosure. The graphical user interface 400 can be provided by a GUI module, such as the GUI module 230. The graphical user interface 400 can include a face image and feature guidelines 421-424 as shown in FIG. 4.

The face image can include a face image of a person. The face image can be obtained by various imaging devices, such as a camera, a camcorder, a surveillance device, a scanner, a fax machine, and the like. The face image can be pre-processed, such as cropped from a picture of a crowd of people, color-tuned, face normalized, and the like. The face image may include portions that may result in unsuccessful facial feature recognitions, such as occlusions, beard growth, tattoos, extreme expressions, and the like. In the FIG. 4 example, the face image includes occlusions by a cap, sunglasses and a scarf.

The feature guidelines 421-424 may be superimposed with the face image to provide assistance to an analyst for registration based on facial features. In the FIG. 4 example, the feature guidelines 421-424 may include a left eye feature guideline 421, a right eye feature guideline 422, nose guideline 423 and mouth guideline 424. Each guideline may further include controllable attributes that can assist the analyst to drive the registration. For example, each feature guideline in FIG. 4 may include an anchor dot indicating a location of a corresponding feature. The analyst may drag the anchor dot to change the feature location.

When the analyst acts on the graphical user interface 400, the GUI module 230 may relay corresponding instructions to a registration update module, such as the registration update module 212 to update the registration. For example, when the analyst drags the anchor dot, the GUI module 230 may relay a feature position change instruction to the registration update module 212. The registration update module 212 can update the registration based on the new feature position.

Figure 5:
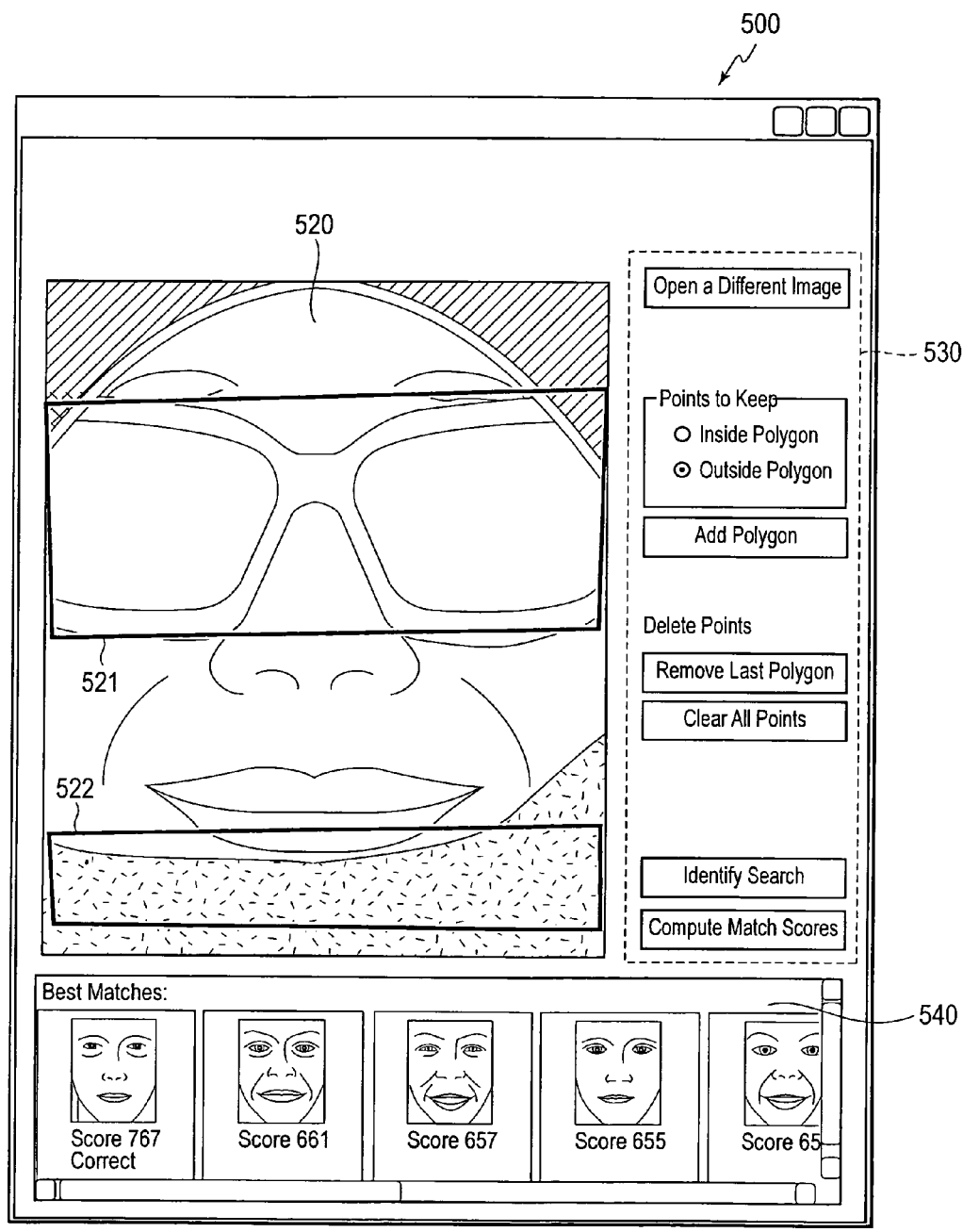
FIG. 5 shows a plot of an exemplary graphical user interface for face recognition according to another embodiment of the disclosure.

FIG. 5 shows a plot of an implemented graphical user interface (GUI) for face recognition according to an embodiment of the disclosure. The implemented GUI 500 can be provided by a GUI module, such as the GUI module 230. The implemented GUI 500 can include an interactive block analysis portion 520, a control portion 530, and a result portion 540 as shown in FIG. 5.

The interactive block analysis portion 520 may include a target face image and marking blocks 521-522 superimposed. The marking blocks 521-522 can be any arbitrary polygons. The marking blocks 521-522 may indicate occluded portions or non-occluded portions that can be controlled by a selection in the control portion 530.

The control portion 530 may include various interactive tools, such as menus, buttons, and the like. In addition, the control portion 530 may enable an analyst to drive the face recognition from various levels. For example, the control portion 530 may include a button for approving the block analysis and starting a search based on the block analysis. In another example, the control portion 530 can provide a selection to change markings for a polygon. In another example, the control portion 530 can enable the analyst to remove a polygon, and add a new polygon. When the analyst acts in the control portion 530, the action can be converted to an instruction by the GUI module, and the instruction can update the block analysis, for example, via the block analysis update module 222.

The result portion 540 can show a search result based on a block analysis. In the FIG. 5 example, the result portion 540 can include a plurality of face images of known identities. The plurality of face images can be displayed in sequence according to their matching scores to the target face image based on the block analysis.

In a test example, a target face image is taken for a person of known identity. The target face image may include occlusions by sunglasses, scarf and the like, as shown in FIG. 5. Then, the target face image is provided to a face recognition system according to the disclosure. The face recognition system can initialize a block analysis based on a registration approved by an analyst, and inform the block analysis to the analyst via the graphical user interface 500 as shown in FIG. 5.

The analyst may refine the block analysis via the graphical user interface 500. Then, the refined block analysis can be used to match the target face image to a plurality of face images that can include a face image of the person. Shown in the result portion 540, the face image of the person has the highest matching score based on the refined block analysis.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A face recognition method, comprising:
   receiving a target face image;
   initializing, via a processor, a registration of the target face image including obtaining one or more facial portions from the target image based upon facial features, the one or more facial portions each being a portion of the face less than the whole of the face;
   informing a user of the registration by superimposing a marking, for each of the one or more obtained facial portions, on the target image;
   receiving one or more instructions from the user for operating on the registration after the user has been informed of the registration;
   updating the registration based upon a registration updating instruction when the registration updating instruction is received from the user;
   initializing, via the processor, a block analysis of the target face image including dividing the one or more facial portions into a plurality of blocks and marking each of the blocks with one of occluded or non-occluded;
   informing the user of the block analysis by superimposing each of the plurality of blocks on the target image;
   receiving one or more instructions from the user for operating on the block analysis after the user has been informed of the block analysis;
   updating the block analysis based upon a block analysis updating instruction when the block analysis updating instruction is received from the user; and identifying the target face image from a plurality of face images based on the registration and the block analysis of the target face image when the registration and block analysis are approved by an approving instruction,
wherein initializing the block analysis occurs after updating the registration.

2. The face recognition method of claim 1, wherein initializing the block analysis of the target face image, further comprises:
   initializing the block analysis of the target face image based on at least one of a case-based reasoning and a model-based reasoning.

3. The face recognition method of claim 1, wherein identifying the target face image from the plurality of face images based on the registration and the block analysis of the target face image, further comprises:
   encoding the plurality of face images and the target face image based on the approved block analysis.

4. The face recognition method of claim 3, further comprising:
   calculating matching scores for the encoded plurality of face images comparing to the encoded target image; and
   identifying the target face images according to the matching scores.

5. The face recognition method of claim 3, wherein encoding the plurality of face images and the target face image based on the approved block analysis, further comprises:
   selecting a portion of a face image based on the approved block analysis; and
   encoding the portion by at least one of a local binary patterns (LBP) algorithm and a regional Gabor algorithm.

6. A face recognition system, comprising:
   a user interface configured to display a target face image, a registration, and a block analysis of the target face image, and receive instructions from an analyst; and
   a processor configured to
      receive the target face image,
      initialize a registration of the target face image including obtaining one or more facial portions from the target image based upon facial features, the one or more facial portions each being a portion of the face less than the whole of the face,
      provide the registration to the user interface by superimposing a marking, for each of the one or more obtained facial portions, on the target image to inform the analyst of the registration,
      receive one or more instructions from the user interface for operating on the registration after the analyst has been informed of the registration,
      update the registration based upon a registration updating instruction when the registration updating instruction is received from the user interface,
      initialize a block analysis of the target facer image including dividing the one or more facial portions into a plurality of blocks and marking each of the blocks with one of occluded or non-occluded,
      provide the block analysis to the user interface by superimposing each of the plurality of blocks on the target image to inform the analyst of the block analysis,
      receive one or more instructions from the user interface for operating on the block analysis after the analyst has been informed of the block analysis,
      update the block analysis based upon a block analysis updating instruction when the block analysis updating instruction is received from the user interface, and
      identify the target face image from a plurality of face images based on the registration and the block analysis of the target face image when the registration and the block analysis are approved by an approving instruction,
   wherein initializing the block analysis occurs after updating the registration.

7. The face recognition system of claim 6, wherein the processor is further configured to initialize the block analysis of the target face image based on at least one of a case-based reasoning and a model-based reasoning.

8. The face recognition system of claim 6, further comprises:
   a memory unit configured to store the plurality of face images.

9. The face recognition system of claim 6, wherein the processor is further configured to encode the plurality of face images and the target face image based on the approved registration and block analysis.

10. The face recognition system of claim 9, wherein the processor is further configured to select a portion of a face image based on the approved block analysis, and encode the portion by at least one of a local binary patterns (LBP) algorithm and a regional Gabor algorithm.

11. A non-transitory computer readable medium storing program instructions for causing a controller to perform face recognition steps, comprising:
   receiving a target face image;
   initializing a registration of the target face image including obtaining one or more facial portions from the target image based upon facial features, the one or more facial portions each being a portion of the face less than the whole of the face;
   informing a user of the registration by superimposing a marking, for each of the one or more obtained facial portions, on the target image;
   receiving one or more instructions from the user for operating on the registration after the user has been informed of the registration;
   updating the registration based upon a registration updating instruction when the registration updating instruction is received from the user;
   initializing a block analysis of the target face image including dividing the one or more facial portions into a plurality of blocks and marking each of the blocks with one of occluded or non-occluded;
   informing the user of the block analysis by superimposing each of the plurality of blocks on the target image;
   receiving one or more instructions from the user for operating on the block analysis after the user has been informed of the block analysis;
   updating the block analysis based upon a block analysis updating instruction when the block analysis updating instruction is received from the user; and
   identifying the target face image from a plurality of face images based on the registration and the block analysis of the target face image when the registration and block analysis are approved by an approving instruction,
   wherein initializing the block analysis occurs after updating the registration.

12. The non-transitory computer readable medium of claim 11, wherein initializing the block analysis further comprises:
   initializing the block analysis of the target face image based on at least one of a case-based reasoning and a model-based reasoning.

13. The non-transitory computer readable medium of claim 11, wherein the identifying step further comprises:

encoding the plurality of face images and the target face image based on the approved block analysis.

14. The face recognition method of claim 1, wherein updating the block analysis includes at least one of resizing, reshaping, remarking, and creation of a block based upon the block analysis updating instruction received from the user.

15. The non-transitory computer readable medium of claim 13, wherein the encoding step further comprises:
 selecting a portion of a face image based on the approved block analysis; and
 encoding the portion by at least one of a local binary patterns (LBP) algorithm and a regional Gabor algorithm.

16. The face recognition method of claim 1, wherein initializing the block analysis includes initializing the block analysis based upon one or more previous successful cases.

* * * * *